US010459069B2

(12) United States Patent
Colentier et al.

(10) Patent No.: US 10,459,069 B2
(45) Date of Patent: Oct. 29, 2019

(54) AIRBORNE EQUIPMENT FOR DETECTING SHOOTINGS AND ASSISTING PILOTING

(71) Applicant: SAFRAN ELECTRONICS & DEFENSE SAS, Boulogne Billancourt (FR)

(72) Inventors: Sylvie Colentier, Boulogne Billancourt (FR); Emmanuel Kling, Boulogne Billancourt (FR); Georges-Olivier Reymond, Boulogne Billancourt (FR); Sylvain Negroni, Boulogne Billancourt (FR)

(73) Assignee: SAFRAN ELECTRONICS & DEFENSE SAS, Boulogne Billancourt (FR)

( * ) Notice: Subject to any disclaimer, the term of this patent is extended or adjusted under 35 U.S.C. 154(b) by 165 days.

(21) Appl. No.: 15/547,601

(22) PCT Filed: Mar. 14, 2016

(86) PCT No.: PCT/EP2016/055404
§ 371 (c)(1),
(2) Date: Jul. 31, 2017

(87) PCT Pub. No.: WO2016/142549
PCT Pub. Date: Sep. 15, 2016

(65) Prior Publication Data
US 2018/0017662 A1    Jan. 18, 2018

(30) Foreign Application Priority Data
Mar. 12, 2015    (FR) ..................... 15 00470

(51) Int. Cl.
*G01S 5/16*    (2006.01)
*G08G 5/04*    (2006.01)
(Continued)

(52) U.S. Cl.
CPC ................. *G01S 5/16* (2013.01); *B64D 45/00* (2013.01); *F41G 3/147* (2013.01); *F41H 11/00* (2013.01);
(Continued)

(58) Field of Classification Search
CPC . F41G 3/147; F41H 11/00; G01S 5/16; G01C 23/00; B64D 43/00; G08G 5/025; G08G 5/045
See application file for complete search history.

(56) References Cited

U.S. PATENT DOCUMENTS 3,445,807 A * 5/1969 Boren ..................... G01S 11/14
367/112
5,465,212 A * 11/1995 Fowler .................... F41G 5/18
244/177
(Continued)

FOREIGN PATENT DOCUMENTS

GB    2 006 463 A    5/1979

OTHER PUBLICATIONS

FAA, "Radio communications phraseology and techniques", P-8740-47, Author: Federal Aviation Administration; Date: revised Apr. 2006, 6 pages (Year: 2006).*
(Continued)

Primary Examiner — Behrang Badii
Assistant Examiner — David A Testardi
(74) Attorney, Agent, or Firm — Oliff PLC; R. Brian Drozd

(57) ABSTRACT

An airborne shootings detection and piloting aid equipment is disclosed for an aircraft including a multi-sensor system supplying signals representing an environment of the aircraft including at least one system supplying a signal, referred to as an LWIR/MWIR signal, representing infrared radiation lying the far infrared or mid-infrared range; piloting aid
(Continued)

means for obtaining first piloting information including information representing obstacles present in the environment of the aircraft; and shootings detection means for obtaining second piloting information including information representing shootings in the vicinity of the aircraft, the piloting aid means and the shootings detection means using signals representing an environment of the aircraft including at least the LWIR/MWIR signal; and obtaining means for obtaining piloting aid parameters from first and second piloting information.

19 Claims, 8 Drawing Sheets

(51) Int. Cl.
| | | |
|---|---|---|
| G01C 23/00 | (2006.01) | |
| F41H 11/00 | (2006.01) | |
| F41G 3/14 | (2006.01) | |
| G01S 3/784 | (2006.01) | |
| G01S 5/18 | (2006.01) | |
| B64D 45/00 | (2006.01) | |

(52) U.S. Cl.
CPC ............. *G01C 23/00* (2013.01); *G01S 3/784* (2013.01); *G01S 5/18* (2013.01); *G08G 5/045* (2013.01)

(56) References Cited

U.S. PATENT DOCUMENTS

| | | | | |
|---|---|---|---|---|
| 5,686,889 A * | 11/1997 | Hillis | ...................... | F41G 3/147 250/330 |
| 6,215,731 B1 * | 4/2001 | Smith | ...................... | F41H 11/00 367/128 |
| 6,232,602 B1 * | 5/2001 | Kerr | .......................... | G06T 1/20 250/330 |
| 7,196,329 B1 * | 3/2007 | Wood | ...................... | G01C 7/00 250/330 |
| 7,617,022 B1 * | 11/2009 | Wood | ...................... | G02B 27/01 340/447 |
| 8,320,217 B1 * | 11/2012 | Barger | ...................... | F41G 3/147 367/127 |
| 8,353,121 B2 * | 1/2013 | Clark | ....................... | F41A 19/01 42/1.01 |
| 2005/0253928 A1 * | 11/2005 | McKeown | ............. | G01C 11/02 348/164 |
| 2007/0125951 A1 * | 6/2007 | Snider | ................ | G06K 9/00771 250/363.03 |
| 2008/0027649 A1 * | 1/2008 | Oertel | ...................... | G01V 8/00 702/5 |
| 2008/0164411 A1 * | 7/2008 | Kerr | ........................ | G01C 23/00 250/330 |
| 2008/0291075 A1 | 11/2008 | Rapanotti | | |
| 2010/0020643 A1 * | 1/2010 | Barger | .................... | F41G 3/147 367/129 |
| 2010/0295945 A1 * | 11/2010 | Plemons | ................... | B60R 1/00 348/148 |
| 2012/0242864 A1 * | 9/2012 | Pauli | ....................... | F41G 3/147 348/236 |
| 2013/0099096 A1 * | 4/2013 | Hutchin | .................. | F41G 3/147 250/208.1 |
| 2013/0179063 A1 * | 7/2013 | Herman | .................. | G01S 11/02 701/300 |
| 2013/0192451 A1 * | 8/2013 | Scott | ......................... | F41G 3/00 89/41.05 |
| 2014/0132804 A1 * | 5/2014 | Guissin | ................. | G02B 13/06 348/239 |
| 2014/0184806 A1 | 7/2014 | Tidhar | | |
| 2015/0077284 A1 * | 3/2015 | Tidhar | .................... | G01S 3/782 342/52 |
| 2015/0138534 A1 * | 5/2015 | Tidhar | .................... | F41G 3/147 356/51 |
| 2015/0219426 A1 * | 8/2015 | Moraites | ................... | G06T 7/70 89/1.11 |
| 2015/0242702 A1 * | 8/2015 | Aphek | ............... | G06K 9/00771 382/113 |
| 2015/0355350 A1 * | 12/2015 | Mederos | ................. | G01V 8/10 356/72 |
| 2016/0335504 A1 * | 11/2016 | Midavaine | ......... | G06K 9/00624 |

OTHER PUBLICATIONS

Wikipedia article, "Infrared", Old revision dated Feb. 24, 2015, 18 pages (Year: 2015).*
Wikipedia article, "Microbolonneter", Old revision dated Mar. 8, 2015, 6 pages (Year: 2015).*
Jun. 16, 2016 Search Report issued in International Patent Application No. PCT/EP2016/055404.
Damarla et al; "Sniper Localization Using Acoustic Asynchronous Sensors;" IEEE Sensors Journal; Sep. 2010; vol. 10; No. 9; pp. 1469-1478.
Prado et al; "An Acoustic Sniper Localization System;" Proc. SPIE 2938, Command, Control, Communications, and Intelligence Systems for Law Enforcement; 318; Feb. 18, 1997; 8 pp.

* cited by examiner

AIRBORNE EQUIPMENT FOR DETECTING SHOOTINGS AND ASSISTING PILOTING

The present invention relates to a combined method for assisting piloting and detecting shootings and to airborne equipment for an aircraft able to implement said method.

Aircraft are known, such as helicopters or aeroplanes, comprising shootings-detection systems and piloting-assistance systems. Shootings-detection systems allow to detect whether an aircraft is being attacked by shootings from a light weapon or a heavy weapon or by a missile shooting.

The article "Sniper Location Using Acoustic Asynchronous Sensors" by Damarla T; Kaplan L M; Whipps, G. T., Sensors Journal, IEEE, vol. 10, no. 9, pp. 1469, 1478, Sep. 2010) describes a method for locating a sniper based on acoustic sensors. The method relies on a measurement of difference between a muzzle blast and a noise referred to as "Mach wave" (also referred to as "shock wave" or "Mach shock wave" or "ballistic wave"). The shock wave corresponds to a supersonic bang caused by a projectile having supersonic speed. This method is unsuitable in an aircraft context such as a helicopter since a helicopter generates a noise that would cover the muzzle blast. Moreover, problems with imprecision of the location have often been reported for sniper location methods based on acoustic systems.

The article "An acoustic sniper location system" by Gervasio Prado; Hardave Dhaliwal; Philip O. Martel; Proc. SPIE 2938, Command, Control, Communications, and Intelligence Systems for Law Enforcement, 318 (Feb. 18, 1997) describes a sniper location system also based on detections of muzzle blasts and/or shock waves using acoustic sensors. This article deals with the problems of imprecision of acoustic systems and proposes supplementing location using acoustic sensors with location using infrared sensors. One location method used by the system consists of locating an area where shootings originates using acoustic sensors. An infrared sensor is next pointed to the origination area in order to locate an origin of the shootings precisely. This method therefore requires a two time location since a location based on the acoustic sensors is followed by a location based on the infrared sensor. This system therefore gives rise to a latency that may be detrimental when a shooting requires a very rapid reaction by an operator, a soldier or an aircraft pilot.

Moreover, an aircraft must be able to fly in various climatic conditions, and in particular in climatic conditions not offering good visibility (night-time, rain, snow, fog, smoke, dust, etc). Piloting aid systems enable a pilot to navigate more easily in poor climatic conditions. Piloting aid systems cover in particular night vision systems, obstacle detection systems, and systems for detecting beacons and signal lights.

The detection of shootings (hostile or non-hostile) and piloting aid are two different fields calling out different expertise, which explains why shootings detection systems and pilot aid systems are currently developed independently. An aircraft is therefore in general equipped with two separate systems, a first system being dedicated to shootings detection and a second system being dedicated to piloting aid. Such separation causes numerous problems such as problems of space occupied by the two systems, the arrangement of two systems on an aircraft and weight problems. Moreover, the separate development of the two systems prevents the seeking of possible synergies that may exist between a navigation aid system and a shootings detection system.

It is desirable to overcome these various drawbacks of the prior art.

In general terms, it is desirable to reduce the volume and weight of the shootings detection and piloting aid systems so that they can be integrated in an aircraft more easily. It is also desirable to take advantage of any synergies between a shootings detection system and a piloting aid system.

According to a first aspect of the invention, the invention relates to an airborne shootings detection and piloting aid equipment for an aircraft comprising: a multi-sensors system supplying signals representing an environment of the aircraft comprising: at least one system, referred to as an LWIR/MWIR system, supplying a signal, referred to as an LWIR/MWIR signal, representing infrared radiation lying in the far infrared or mid-infrared range; at least one system, referred to as an NIR system, supplying a signal, referred to as a NIR signal, representing infrared radiation lying in the near infrared range; and at least one acoustic system supplying an acoustic signal; processing means comprising: piloting aid means for obtaining first piloting information comprising information representing obstacles present in the environment of the aircraft; and shootings detection means for obtaining second piloting information comprising information representing shootings in the vicinity of the aircraft, the piloting aid means and the shootings detection means using signals representing an environment of the aircraft comprising at least the LWIR/MWIR signal; and obtaining means for obtaining piloting aid parameters from first and second piloting information; the shootings detection means comprising: search means for seeking singularities in signals representing an environment of the aircraft, comprising means for seeking a first singularity in a first signal included in the signals representing an environment of the aircraft and means for seeking a second singularity in at least a second signal included in the signals representing an environment of the aircraft; determination means for determining, using a result of the search means, whether an event corresponding to an event type sought has been detected; location means for determining a geographical location of an origin of a detected event using information supplied by the piloting aid means; and obtaining means for obtaining second piloting information according to a type of event detected and a geographical location of an origin of said event.

The airborne equipment is therefore equipment for detecting shootings and a piloting aid. This airborne equipment benefits from synergy between the shootings detection and the piloting aid since the shootings detection means reuse information obtained by the piloting aid means in order to determine a geographical location of an origin of an event. Moreover, the piloting aid means and the shootings detection means use a signal supplied by the same system, i.e. the LWIR/MWIR signal supplied by at least one LWIR/MWIR system. Such putting in common of an LWIR/MWIR system affords a reduction in size and weight of the airborne equipment.

According to one embodiment, each LWIR/MWIR system comprises an optical device, referred to as an LWIR/MWIR obstacle device, and an acquisition device, referred to as an LWIR/MWIR acquisition device, supplying an LWIR/MWIR signal in the form of images, referred to as LWIR/MWIR images, and each NIR system comprises an optical device, referred to as an NIR optical device and an acquisition device, referred to as an NIR acquisition device, supplying an NIR signal in the form of images, referred to as NIR images, the multi-sensor system comprising a number of LWIR/MWIR systems and NIR systems dependent on a respective resolution of the LWIR/MWIR and NIR images to be obtained.

In this way, it is possible to achieve resolutions of LWIR/MWIR or NIR images sufficient for the piloting aid and the detection of shootings.

According to one embodiment, each LWIR/MWIR acquisition device comprises a bolometric sensor able to capture the LWIR/MWIR signal.

A bolometric sensor allows to capture a LWIR/MWIR signal continuously.

According to a second aspect of the invention, the invention relates to a plurality of items of airborne equipment according to the first aspect, making it possible, by combining the LWIR/MWIR images, to obtain an image representing a 360° panorama, referred to as a LWIR/MWIR panorama, around the aircraft. In this way, a pilot of the aircraft will obtain piloting aid information and shootings detection information coming from a 360° vicinity around the aircraft.

According to a third aspect of the invention, the invention relates to a combined piloting aid and shootings detection method, implemented by airborne equipment integrated in an aircraft. The method comprises the following steps: acquiring signals representing an environment of the aircraft comprising: a signal, referred to as a LWIR/MWIR signal, representing infrared radiation lying in the far infrared or mid-infrared range, supplied by a system, referred to as a LWIR/MWIR system; a signal, referred to as a NIR signal, representing infrared radiation lying in the near infrared range, supplied by a system, referred to as a NIR system; and an acoustic signal supplied by an acoustic system, implementing a piloting aid procedure and a shootings detection procedure, the piloting aid procedure allowing to obtain first piloting information comprising information representing obstacles present in the environment of the aircraft and the shootings detection procedure allowing to obtain second piloting information comprising information representing shootings in a vicinity of the aircraft, the piloting aid procedure and the shootings detection procedure using signals representing the environment of the aircraft comprising at least the LWIR/MWIR signal; obtaining piloting aid parameters from the first and second items of piloting information; the shootings detection procedure comprising the following steps: seeking singularities in the signals representing the environment of the aircraft, the seeking of singularities comprising a search for a first singularity in a first signal included in the signals representing the environment of the aircraft and a search for a second singularity in at least a second signal included in the signals representing an environment of the aircraft; when a result of the search for the singularities shows that an event corresponding to an event type sought has occurred, determining a geographical location of an origin of said event using information obtained during the implementation of the piloting aid procedure; obtaining the second item of piloting information according to said type and the geographical location of the origin of said event.

The method therefore combines a shootings detection function and piloting aid function. As with the system according to the first aspect, the method benefits from synergy between a shootings detection procedure and a piloting aid procedure since the shootings detection procedure reuses information supplied by the piloting aid procedure in order to determine a geographical location of an origin of an event. Moreover, the LWIR/MWIR signal supplied by at least one LWIR/MWIR system is used by the piloting aid procedure and the shootings detection procedure. The piloting aid procedure and the shootings detection procedure therefore jointly use the same LWIR/MWIR system, which represents a saving in volume and weight for the airborne equipment.

According to one embodiment, the NIR system supplies the NIR signal in the form of images, referred to as NIR images, the LWIR/MWIR system supplies the LWIR/MWIR signal in the form of images, referred to as LWIR/MWIR images, and a singularity is present in the NIR signal when a flash of light is detected in at least one NIR image, a singularity is present in the LWIR/MWIR signal when a flash of light is detected in at least one LWIR/MWIR image, and a singularity is present in the acoustic signal when a shock wave is detected in the acoustic signal.

According to one embodiment, when the search for at least one singularity in the signals representing an environment of the aircraft allows to detect a first flash of light in at least one LWIR/MWIR image and a second flash of light, correlated spatially and temporally with the first flash of light, in at least one NIR image, the event is identified as a solar reflection and does not correspond to an event sought.

In this way, an event that would not have any interest for piloting aid or shootings detection is rejected.

According to one embodiment, when the search for at least one singularity in the signals representing an environment of the aircraft allows to detect a first flash of light in the LWIR/MWIR signal, no second flash of light correlated with the first flash of light having been detected in the NIR signal, the event is identified as a shooting and corresponds to an event sought.

According to one embodiment, when, following the identification of an event corresponding to a shooting and to the determination of the geographical location of the origin of said event, a shock wave having a temporal correlation with the first flash of light is detected in the acoustic signal, the event is identified as a shooting in the direction of the aircraft, the geographical location of the origin of said event being used to determine a level of temporal correlation between the first flash of the light and the shock wave.

The information on the geographical location of the origin of the shooting obtained using the information supplied by the piloting aid procedure therefore allows to determine whether a shock wave is correlated temporally with the first flash of light.

According to one embodiment, when the search for at least one singularity in the signals representing an environment of the aircraft allows to detect a second flash of light in the NIR signal, no first flash of light correlated with the second flash of light having been detected in the LWIR/MWIR signal, the event is identified as a detection of a signal light and corresponds to an event sought.

The shootings detection procedure therefore also allows to detect signal lights by virtue of the use of the NIR system.

According to one embodiment, information on the duration of a flash of light is associated with each flash of light, the duration of the flash of light being used to refine the identification of the type of event.

Use of the duration of a flash of light therefore allows to obtain a more reliable shootings detection procedure.

According to one embodiment, information on the frequency of repetition of a flash of light is associated with each detection of a flash of light, the frequency of repetition being used to refine the identification of the type of event.

Use of the frequency of repetition of a flash of light therefore allows to obtain better classification of the weapon used for the shootings detected.

According to one embodiment, when the event identified corresponds to a shooting, the piloting aid parameters obtained comprise information representing a range-of-shooting zone and/or a direction of exit from a range-of-shooting zone.

According to one embodiment, when the event identified corresponds to a detection of a signal light, the piloting aid parameters obtained comprise information representing a zone for avoiding the signal light and/or information representing an avoiding time corresponding to an estimation of a time that would be necessary for the aircraft to reach a zone for avoiding the signal light and/or a direction of avoiding a zone for avoiding the signal light.

According to one embodiment, the method is implemented by the airborne equipment according to the first aspect or by each item of airborne equipment of the aircraft according to the second aspect.

According to a fourth aspect of the invention, the invention relates to a computer program, characterised in that it comprises instructions for the implementation, by a device, of the method according to the third aspect, when said program is executed by a processor of said device.

According to a fifth aspect, the invention relates to storage means, characterised in that they store a computer program comprising instructions for the implementation, by a device, of the method according to the third aspect, when said program is executed by a processor of said device.

The features of the present invention mentioned above, as well as others, will emerge more clearly from a reading of the following description of an example embodiment, said description being given in relation to the accompanying drawings, among which:

The description detailed hereinafter sets out to describe various embodiments of the present invention in a helicopter context. The principles of the present invention do however apply in a wider context. The principles of the present invention are in fact applicable to any aircraft for which shootings detection and piloting aid are useful, such as a dirigible, an aeroplane, a glider, a hot-air balloon, a drone, a rocket, a missile, etc.

Figure 1:
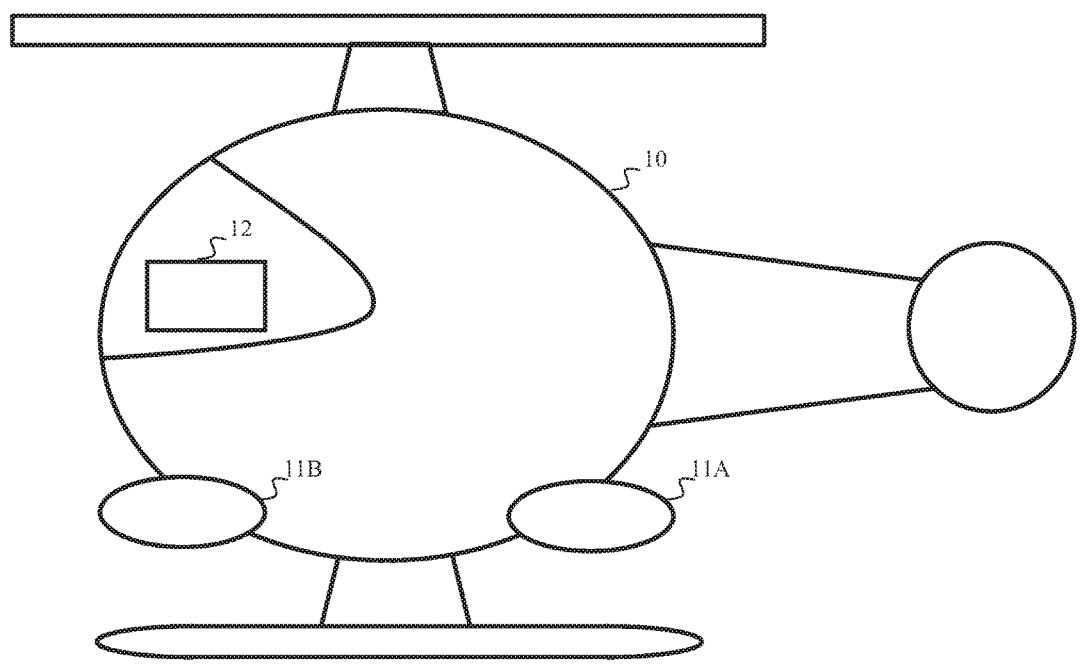
FIG. 1 illustrates schematically an example of installation in an aircraft of at least one item of airborne shootings detection and piloting aid equipment.

FIG. 1 illustrates schematically an example of the installation in an aircraft 10 of at least one item of airborne shootings detection and piloting aid equipment. Each item of airborne shootings detection and piloting aid equipment is suited to the detection of various types of shootings, such as light infantry weapon shootings, artillery shootings, rocket propelled grenade shootings and ground to air missile shootings.

In this example, the aircraft 10 is a helicopter. The aircraft 10 comprises two items of airborne shootings detection and piloting aid equipment 11A and 11B. Hereinafter, to simplify, we refer to each item of airborne shootings detection and piloting aid equipment as airborne equipment. In the example in FIG. 1, the items of airborne equipment are distributed at the front and rear of the aircraft 10. An aircraft in general comprises a number of items of airborne equipment making it possible to cover a cylindrical panorama corresponding to an optical field of 360° around the aircraft. Moreover, the aircraft 10 comprises a display device 12 such as a screen, a head-up display or electronic goggles for displaying data issuing from the airborne equipment 11A and 11B.

Figure 2:
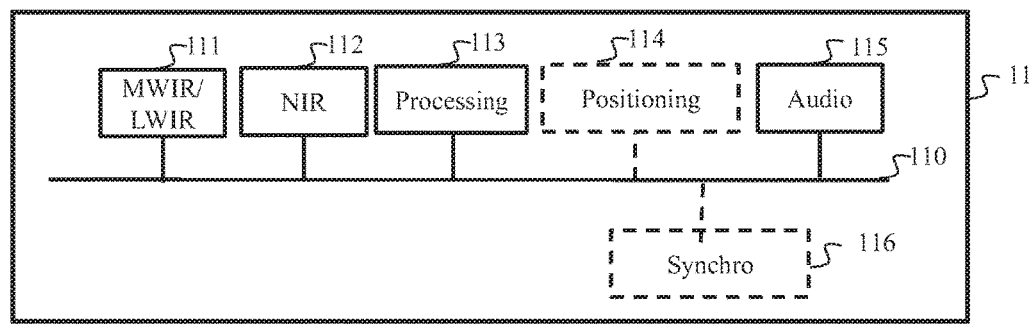
FIG. 2 illustrates schematically a first example of airborne shootings detection and piloting aid equipment according to the invention.

FIG. 2 illustrates schematically a first example of airborne shootings detection and piloting aid equipment 11 according to the invention. The airborne equipment 11 comprises, connected by a communication bus 110, a processing module 113 and a multi-sensor system comprising a system 111, referred to as an LWIR/MWIR system, which we shall describe hereinafter in relation to FIG. 3, a system 112, referred to as an NIR system, which we shall describe hereinafter in relation to FIG. 7, and an acoustic system 115 supplying an acoustic signal.

In a particular embodiment, the airborne equipment 11 further comprises a positioning device 114. The positioning device 114 supplies information representing a position, orientation and speed of the aircraft 10 used in a piloting aid procedure implemented by the airborne equipment 11. This positioning device 114 may for example be an inertia measurement unit (IMU).

In one embodiment, the LWIR/MWIR 111, NIR 112 and acoustic 115 systems, and the positioning device 114 when present, are synchronised timewise on the same clock information supplied for example by the processing module 113. In this way, each signal issuing from the LWIR/MWIR 111, NIR 112 and acoustic 115 systems and from the positioning device 114 is associated with time information based on a common clock.

In one embodiment, the airborne equipment 11 comprises a synchronisation device 116, such as a GPS (global positioning system) device supplying clock information enabling the LWIR/MWIR 111, NIR 112 and acoustic 115 systems, and the positioning device 114 when present, to be synchronised on the same clock. In one embodiment, the positioning device 114 and the synchronisation device 116 are the same device, such as a GPS device.

Figure 3:
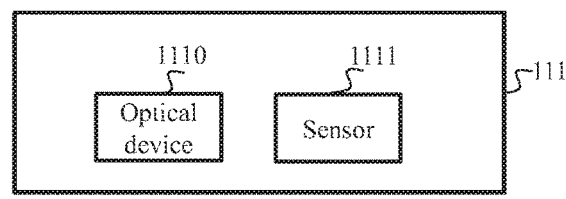
FIG. 3 illustrates schematically a system supplying a signal representing infrared radiation included in the long wavelength infrared (LWIR) range or in the medium wavelength infrared (MWIR) range.

FIG. 3 illustrates schematically an LWIR/MWIR system 111, supplying a signal, referred to as a LWIR/MWIR signal, representing infrared radiation lying in the long wavelength infrared (LWIR) range and in the medium wavelength infrared (MWIR) range.

The LWIR/MWIR system 111 comprises an optical device 1110, referred to as a LWIR/MWIR optical device, and an acquisition device 1111, referred to as a LWIR/MWIR acquisition device, supplying the LWIR/MWIR signal in the form of images, referred to as LWIR/MWIR images.

The LWIR/MWIR acquisition device 1111 is implemented, for example, by a dual-band bolometric sensor, i.e. a bolometric sensor able to capture infrared radiations corresponding to medium wavelength infrared MWIR and long wavelength infrared LWIR. One advantage of a dual-band bolometric sensor is that it avoids having two sensors, each of the two sensors being dedicated to a given infrared band. Moreover, a bolometric sensor functions continuously, i.e. it captures infrared radiations continuously, unlike other sensors, which sample infrared radiation captured at a predefined frequency.

The LWIR/MWIR optical device 1110 allows to cover a predefined optical field, for example 120° horizontally and 90° vertically. Each LWIR/MWIR optical device 1110 and each LWIR/MWIR acquisition device 1111 are oriented towards a zone to be observed. The LWIR/MWIR images have a resolution dependent on a resolution of the LWIR/MWIR acquisition device 1111, for example equal to 512 pixels in width and 384 pixels in height.

Figure 4:
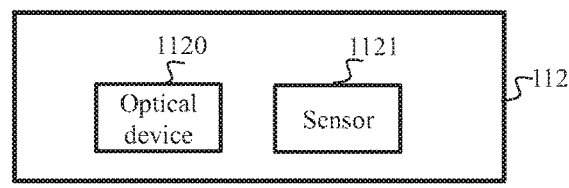
FIG. 4 illustrates schematically a system supplying a signal representing infrared radiation included in the near infrared (NIR) range.

FIG. 4 illustrates schematically a NIR system 112 supplying a signal, referred to as a NIR signal, representing infrared radiation lying in the near infrared (NIR) range.

The NIR system 112 comprises an optical device 1120, referred to as a NIR optical device, and an acquisition device 1112, referred to as a NIR acquisition device, supplying the NIR signal in the form of images, referred to as NIR images. The NIR optical device 1120 allows to cover a predefined optical field, for example 120° horizontally and 90° vertically. Each NIR optical device 1120 and each NIR acquisition device 1121 are oriented towards a zone to be observed.

The NIR images have a resolution dependent on a resolution of the NIR acquisition device 1121, for example equal to 1024 pixels in width and 768 pixels in height.

It should be noted that, in the example of the airborne device 11 described in relation to FIG. 2, the optical field covered by the LWIR/MWIR optical device 1110 is the same as the optical field covered by the NIR optical device 1120.

Figure 5:
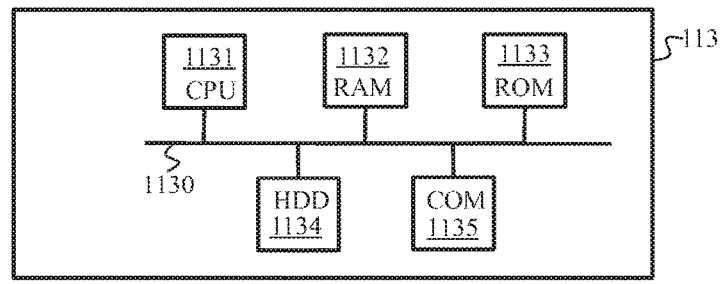
FIG. 5 illustrates schematically a hardware architecture of a processing module able to implement the combined piloting aid and shootings detection method.

FIG. 5 illustrates schematically a hardware architecture of a processing module 1113.

According to the example of hardware architecture depicted in FIG. 5, the processing module 113 then comprises, connected by a communication bus 1130: a processor or CPU (central processing unit) 1131; a random access memory (RAM) 1132; a read only memory (ROM) 1133; a storage unit such as a hard disk or a storage medium reader, such as an SD (secure digital) card reader 1134; at least one communication interface 1135 enabling for example the processing module 113 to communicate with the LWIR/MWIR 111, NIR 112 and acoustic 115 systems, with the positioning 114 and synchronisation 116 devices when present, and with a display device 12.

The processor 1131 is capable of executing instructions loaded in the RAM 1132 from the ROM 1133, from an external memory (not shown), from a storage medium (such as an SD card) or from a communication network. When the airborne equipment 11 is powered up, the processor 1131 is capable of reading instructions from the RAM 1132 and executing them. These instructions form a computer program causing the implementation, by the processor 1131, of all or some of the algorithms and steps described in relation to FIG. 6A.

All or some of the algorithms described below in relation to FIG. 6A may be implemented in software form by the execution of a set of instructions by a programmable machine, such as a DSP (digital signal processor) or a microcontroller, or be implemented in hardware form by a machine or a dedicated component, such as a FPGA (field-programmable gate array) or an ASIC (application-specific integrated circuit).

Figure 6A:
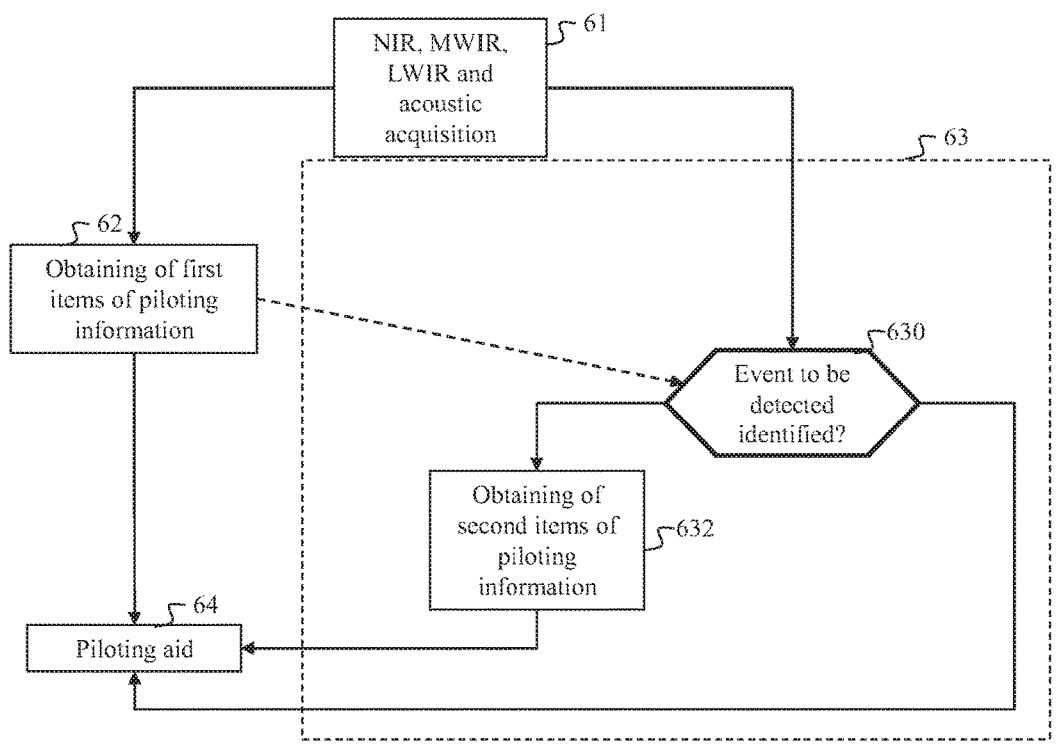
FIG. 6A illustrates schematically an example of a combined piloting aid and shootings detection method.

FIG. 6A illustrates schematically an example of a combined example of a combined piloting aid and shootings detection method. The method described in relation to FIG. 6A is implemented periodically by the processing module 113 with a frequency, for example 50 Hz, suitable for detecting an obstacle, a shooting or a signal light very quickly.

In a step 61, the airborne equipment 11, under the control of the processing module 113, acquires signals representing an environment of the aircraft 10 from the multi-sensor system.

Following step 61, the processing module 113 implements a piloting aid procedure 62 and a shootings detection procedure 63.

The piloting aid procedure 62 allows to obtain first piloting information comprising information representing obstacles present in the environment of the aircraft. Information representing an obstacle may comprise for example a three-dimensional (3D) reconstruction of the obstacle and/or a 3D reconstruction of a ground above which the aircraft 10 is moving, the ground being considered to be an obstacle.

Methods for the 3D reconstruction of a scene from images are known. These methods use images offering different views of the same scene. Epipolar geometry techniques are applied to these images in order to obtain a 3D reconstruction of the scene. There exist various methods for obtaining images representing the different views of the same scene. In a first method, images offering different views of the same scene are obtained by the same image acquisition system, by making a plurality of successive acquisitions of images of the scene from different viewpoints. In a second method, a plurality of image acquisition systems each having a different viewpoint on the scene is used.

When the piloting aid procedure 62 is implemented by the processing module 113, the processing module 113 applies one of the 3D reconstruction methods mentioned above to the LWIR/MWIR images. It is known in fact that an infrared signal corresponding to long wavelength infrared (LWIR) is particularly suitable for obtaining an effective 3D reconstruction of an obstacle or of a ground under poor visibility conditions. The LWIR/MWIR system 111 allows to obtain a LWIR/MWIR signal comprising essentially data representing infrared radiations situated in the long wavelength infrared (LWIR) range.

The use of a 3D reconstruction method allows to provide the pilot of the aircraft 10 with a 3D reconstruction of the obstacles situated in the vicinity of the aircraft 10 and/or a 3D reconstruction of a ground above which the aircraft 10 is travelling.

It should be noted that, since the airborne equipment 11 described in relation to FIG. 2 comprises only one LWIR/MWIR system 111, this LWIR/MWIR system supplies successively LWIR/MWIR images of different views of the environment of the aircraft 10 acquired at different instants to allow implementation of the 3D reconstruction method. It is assumed here that the aircraft 10 is in movement and that consequently two successive images of the same scene observed by the LWIR/MWIR system, acquired at different instants, represent two different views of the same scene.

The information representing an obstacle obtained during the implementation of the 3D reconstructions procedure may be enhanced using information on the positioning and speed of the aircraft 10. The information on positioning and speed of the aircraft 10 is in particular used to determine information allowing to avoid collisions with obstacles. The information allowing to avoid collisions with obstacles comprises, for example, information indicating a relative position of the aircraft 10 with respect to an obstacle and/or information indicating a direction for avoiding an obstacle, and/or information indicating a time before a collision with an obstacle. In one embodiment, the information on positioning, orientation and speed of the aircraft 10 are supplied by the positioning device 114. The information representing an obstacle, comprising a 3D reconstruction (of obstacles or ground) and information allowing to avoid collisions with obstacles, thus helps the pilot of the aircraft 10 to travel in an environment offering little visibility.

The shootings detection procedure 63 allows to obtain second items of piloting information comprising information representing shootings in the vicinity of the aircraft 10. When the shootings detection procedure 63 is implemented, the processing module 113 seeks, during a step 630, at least one singularity in the signals representing an environment of the aircraft 10 supplied by the multi-sensor system. The step 630 of seeking at least one singularity, detailed hereinafter in relation to FIG. 6B, allows to determine whether an event corresponding to an event type sought has occurred in the vicinity of the aircraft and to determine a geographic location of an origin of this event.

When an event corresponding to an event type sought is identified during step 630, the processing module 113 obtains, during a step 632, the second items of piloting information according to the type and geographical location of the origin of said event. An example of a method implemented during step 632 is described, hereinafter, in relation to FIG. 6C. The processing module 113 then implements a step 64, during which the processing module 113 displays, on a display device of the pilot of the aircraft 10, piloting aid parameters determined from the first and second items of piloting information. The piloting aid parameters comprise for example a 3D reconstruction of the obstacles or of the ground surrounding the aircraft corresponding to the first items of piloting information on which the second items of piloting information are overlaid. As we describe hereinafter in relation to FIG. 6C, the second items of piloting information comprise for example information on the geographical location of origins of shootings and/or position lights and/or information representing range-of-shooting zones and/or zones for avoiding position lights and/or directions for leaving range-of-shooting zones and/or directions for steering clear of avoiding zones.

When no event corresponding to an event type sought is identified, the processing module 113 implements the step 64 of obtaining piloting parameters using solely the first items of piloting information.

Figure 6B:
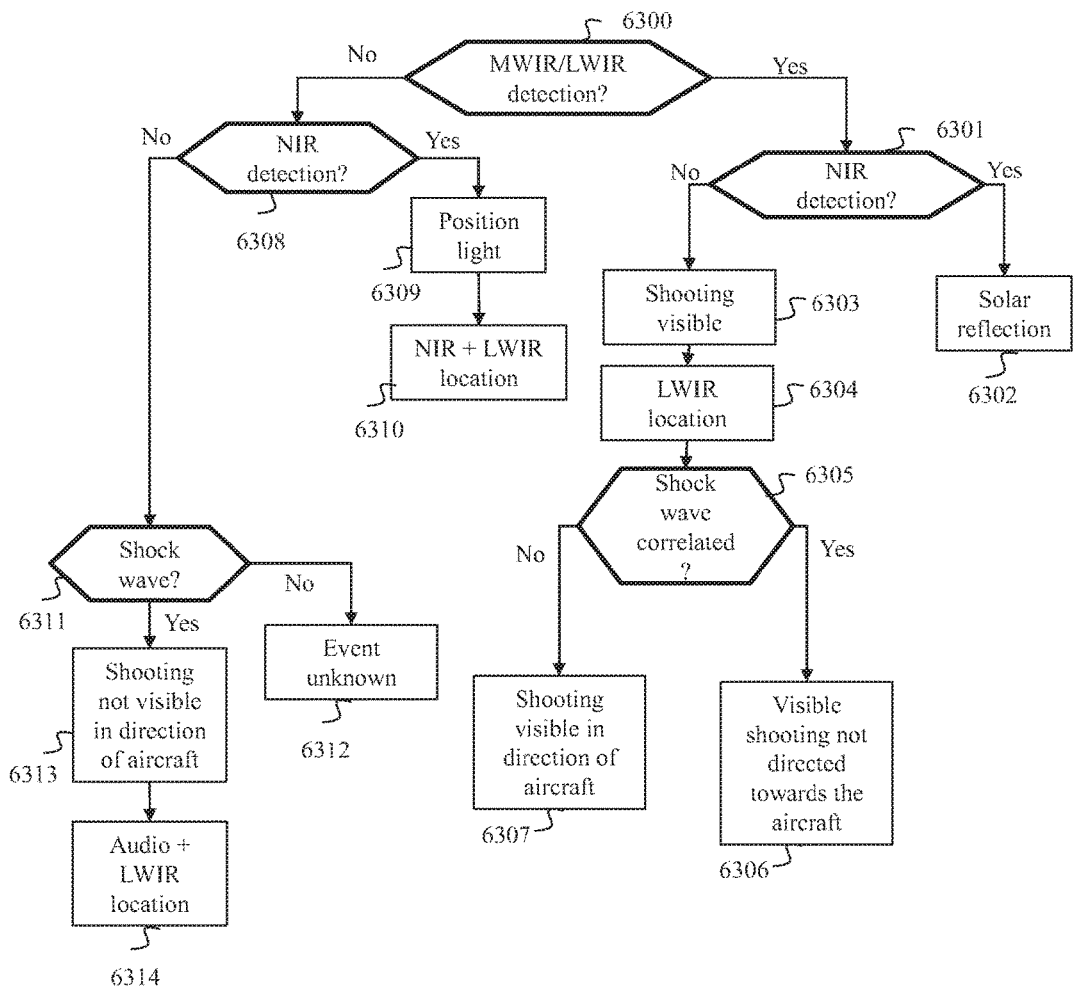
FIG. 6B illustrates schematically an example of a method for seeking at least one singularity in signals representing an environment of an aircraft.

FIG. 6B illustrates schematically an example of a method for seeking at least one singularity in the signals representing an environment of the aircraft 10.

In a step 6300, the processing module 113 seeks a first singularity in a first signal included in the signals representing the environment of the aircraft 10. In the example described in relation to FIG. 6B, the first signal is the LWIR/MWIR signal. In this case, it is considered that a singularity is present in the LWIR/MWIR signal when a flash of light is detected in at least one LWIR/MWIR image.

A flash of light appears in an image in the form of a high-luminance object on a background of lower luminance. In a context of detecting shootings or signal lights, the flash of light corresponds to a signal supplied by an image acquisition signal corresponding to a light signal caused by a muzzle blast or a signal light. To detect a flash of light in an image, the processing module 113 uses a procedure for detecting a flash of light. In one embodiment, this procedure comprises the obtaining of a different image corresponding to a pixel by pixel subtraction between the image in which a flash of light is sought and a previous image. A search for high spatial gradients is then carried out on the difference image by the processing module 113. This search may comprise for example a calculation of a gradient of luminance values for each pixel in the difference image. To do this, the processing module 113 calculates an average of the differences between said pixels and eight adjacent pixels. When an area of the difference image has a boundary on which high gradients have been calculated, this area is interpreted as a flash of light. In one embodiment, the image in which the flash is sought and the previous image are adjusted by anamorphosis in order to compensate for the movements of the aircraft 10 between the two images.

A flash of light may have several causes. Some causes, such as solar reflection, are of no interest in the detection of shootings and must therefore not be taken into account. It is known that a solar reflection is visible in an NIR signal and in an MWIR or LWIR signal whereas a flash of light due to a shooting is visible in a MWIR signal, slightly visible in a LWIR signal, but invisible in a NIR signal.

When a first singularity is found in the LWIR/MWIR signal, i.e. when a first flash of light is detected in at least one LWIR/MWIR image, the processing module 113 seeks, in a step 6301, a second singularity in at least one second signal included in the signals representing the environment of the aircraft 10. Here the first and second singularities come from different signals. So that these two singularities allow to identify an event sought, it is necessary for these two singularities to have the same origin. It is considered that the first and second singularities have the same origin when these two singularities are correlated timewise. A first singularity detected in an LWIR/MWIR signal is considered to be correlated timewise with a second singularity detected in an NIR signal when these two singularities correspond to the same instant of acquisition. A first singularity detected in the acoustic signal is considered to be correlated timewise with a second singularity detected in a NIR (or respectively LWIR/MWIR) signal, when the two instants of acquisition of the first and second singularities are offset by a period dependent on the difference between the speed of propagation of light and the speed of propagation of sound.

When the first singularity is a flash of light in a LWIR/MWIR image, the second singularity is sought in the NIR signal. It is considered that a singularity is present in the NIR signal when a flash of light is detected in at least one NIR image. The processing module 113 then proceeds with a search for a second flash of light in a NIR image in the same way that it had sought the first flash of light in a LWIR/MWIR image. If a second flash of light correlated spatially and temporally with the first flash of light is detected in a NIR image, the processing module 113 determines, in a step 6302, that the first and second flashes of light correspond to a solar reflection. A detection of a solar reflection does not correspond to an event sought. It is considered here that a first flash of light in a LWIR/MWIR image is correlated temporally and spatially with a second flash of light in a NIR image if the two flashes of light correspond to the same instant and have respective spatial positions in the corresponding LWIR/MWIR and NIR images. The spatial and temporal correlation between the first and second flashes of light allows to determine that the two flashes of light seen in two different images (an LWIR/MWIR image and an NIR image) correspond to the same physical phenomenon, i.e. the same solar reflection.

If no second flash of light correlated with a first flash of light is detected in a NIR image, the processing module 113 determines, during a step 6303, that the first singularity detected in the LWIR/MWIR image corresponds to a shooting. A detection of a shooting corresponds to an event sought.

In this case, in a step 6304, the processing module 113 determines a geographical location of an origin of the event, i.e. of an origin of the shooting. The first singularity (i.e. the first flash of light) that allowed to identify an event corresponding to a shooting has been detected in at least one LWIR/MWIR image. This first flash of light is associated with a position in each LWIR/MWIR image. As described above in relation to step 620, the LWIR/MWIR images are also used when the obstacle detection procedure 62 is implemented, in order to effect a 3D reconstruction of obstacles or ground. When the 3D reconstruction uses a LWIR/MWIR image containing the first flash of light, the position of the flash of light in the LWIR/MWIR images is projected in the 3D reconstruction. It is then possible to find the geographical location of the origin of the shooting easily from the projection of the position of the first flash of light in the 3D reconstruction and information on the positioning, orientation and speed of the aircraft 10 supplied for example by the device 114. This is because the geographical location of the origin of the shooting is obtained in the same way as the information allowing to avoid collisions with obstacles.

The search for the singularities carried out in steps 6300 and 6301 made it possible to determine that a shooting occurred in the vicinity of the aircraft. These steps do not allow to determine whether the shooting detected was intended for the aircraft.

During a step 6305, in order to determine whether the shooting detected was intended for the aircraft, the processing module 113 seeks in the acoustic signal a singularity correlated timewise with the first singularity, i.e. correlated timewise with the first flash of light detected in at least one LWIR/MWIR image. It is considered that an acoustic signal comprises a singularity when a shock wave is detected in the acoustic signal. In the context of the invention, a shock wave corresponds to a noise amplitude peak in a homogeneous acoustic signal corresponding to the noise of the aircraft 10. Measurements have shown that an aircraft such as a helicopter produces an acoustic signal having a mean amplitude of 100 dB, whereas a shock wave produces a very short acoustic signal culminating at 120 dB. In order to determine a level of correlation between a shock wave and a flash of light, it is necessary to take into account an time offset between the shock wave and the flash of light. A light signal corresponding to a muzzle flash, detected in the form of a flash of light by the LWIR/MWIR system 111, almost instantaneously travels the distance between the geographical location of the origin of the shooting and the aircraft 10. A shock wave occurs when a projectile passes close to the aircraft 10. The time offset T between the shock wave and the flash of light therefore corresponds approximately to the time taken by the projectile to travel the distance D between the origin of the shooting and the aircraft. In one embodiment, it is considered that the projectile has a known velocity V. The time offset T can therefore be obtained by dividing the distance D by the velocity V. A shock wave corresponding to an instant T1 is considered to be correlated with a flash of light corresponding to an instant T2 if a difference T1−T2 is close to T. In one embodiment, the shock wave is correlated with the flash of light if the difference TI−T2 is equal to T.

It may be remarked that the latencies in processing by the LWIR/MWIR system 111 and/or by the acoustic system 115 may interfere with the measurement of the instants T1 and T2. It is considered here that these processing times are known. The time taken by the acoustic device 115 to process an acoustic signal is denoted $\Delta_1$. The time taken by the LWIR/MWIR device 111 to process a LWIR/MWIR signal is denoted $\Delta_2$. In one embodiment, these processing times are taken into account by the processing module 113 in order to determine whether a singularity detected in the acoustic signal is correlated with a singularity detected in the LWIR/MWIR signal. In this embodiment, the shock wave is correlated with the flash of light if the difference $(T1-\Delta_1)-(T2-\Delta_2)$ is equal to T.

When a shock wave correlated with the first flash of light is detected in the acoustic signal, the processing module 113 determines, in a step 6307, that the event corresponds to a shooting in the direction of the aircraft 10. The detection of a shock wave also means that a projectile has passed close to the aircraft 10 and that consequently the aircraft 10 is within shooting range. If no shock wave correlated with a first flash of light is detected, the processing module 113 determines, in a step 6306, that the event corresponds to a shooting not intended for the aircraft 10.

When, during step 6300, no first singularity is detected in the LWIR/MWIR signal, the processing module 113, in a step 6308, seeks a second singularity in the NIR signal. If a flash of light is detected in at least one NIR image, the processing module 113, in a step 6309, determines that a signal light has been detected. Detection of a position light corresponds to an event sought.

In a step 6310, the processing module 113 determines a geographical location of the origin of the event detected, i.e. determines a geographical location of the position light. The flashing light detected in at least one NIR image is associated with coordinates in each NIR image. These coordinates in each NIR image are not sufficient to determine the geographical location of the origin of the event. Once again, in order to determine the geographical location of the origin of the event, the processing module 113 will use information obtained during the implementation of the piloting aid procedure 62. To do this the processing module 113 seeks a LWIR/MWIR image corresponding temporally to each NIR image in which the flash of light was detected. The coordinates of the flash of light in each NIR image are next projected in each LWIR/MWIR image found, which allows to obtain the coordinates of the flash of light detected in at least one NIR image in at least one LWIR/MWIR image. Knowing the coordinates of the flash of light detected in at least one LWIR/MWIR image, the processing module 113 determines the geographical location of the origin of the event in the same way that it had determined the geographical location of the origin of a shooting during step 6304.

When, during step 6308, no first or second singularities are detected respectively in the LWIR/MWIR signals and in the NIR signals, the processing module 113, in a step 6311, seeks a singularity, in the form of a shock wave, in the acoustic signal. If no singularity is detected in the acoustic signal, the processing module 113 determines, in a step 6312, that no event sought has occurred in the vicinity of the aircraft 10.

If a shock wave is detected during step 6311, the processing module 113, in a step 6313, determines that a shooting in the direction of the aircraft 10, not visible in the LWIR/MWIR signal, has been detected. The detection of a shock wave also means that a projectile has passed close to the aircraft 10 and that consequently the aircraft 10 is within shooting range. As seen above, a shooting in the direction of the aircraft is an event sought.

In an embodiment suited to quiet aircraft, the processing module 113 determines a geographical location of the origin of the event, i.e. of the origin of the shooting, by applying methods described in the article "Sniper Location Using Acoustic Asynchronous Sensors", Damarla, T; Kaplan L M; Whipps G T, Sensors Journal, IEEE, vol. 10, no. 9, pp. 1469, 1478, Sep. 2010). In this embodiment, to reinforce the precision of the geographical location, the geographical location obtained using the acoustic signal is projected in the 3D reconstruction of obstacles or ground supplied by the piloting aid method 62.

It is known that a flash of light originating in a weapon is visible on one or two consecutive images at a maximum. Longer durations are possible with high calibres such as artillery. A measurement of a duration of a flash of light, in terms of number of images, may give information that makes the detection of a shooting more robust or allowing to refine an identification of the type of shooting.

Moreover, it is also possible to measure a frequency of repetition of a flash of light. The frequency of repetition may also be used to refine an identification of a shooting type. For example, an isolated flash of light may be identified as a pistol shooting whereas a flash of light having a given frequency of repetition can be interpreted as a shooting emanating from a certain type of machine gun.

In one embodiment, the processing module 113 measures the frequency of repetition and/or the duration of a flash of light and uses the frequency of repetition and/or the duration measured in order to refine an identification of a type of shooting.

The method described in relation to FIG. 6B begins with a search for a singularity in LWIR/MWIR images, and then continues with a search for a singularity in NIR images and a search for singularities in the acoustic signal. The order of search in the signals representing an environment of the aircraft 10 could however be different without this giving rise to any changes to the results of the method. The method could, for example, begin with a search for a singularity in the NIR images or in the acoustic signal.

Figure 6C:
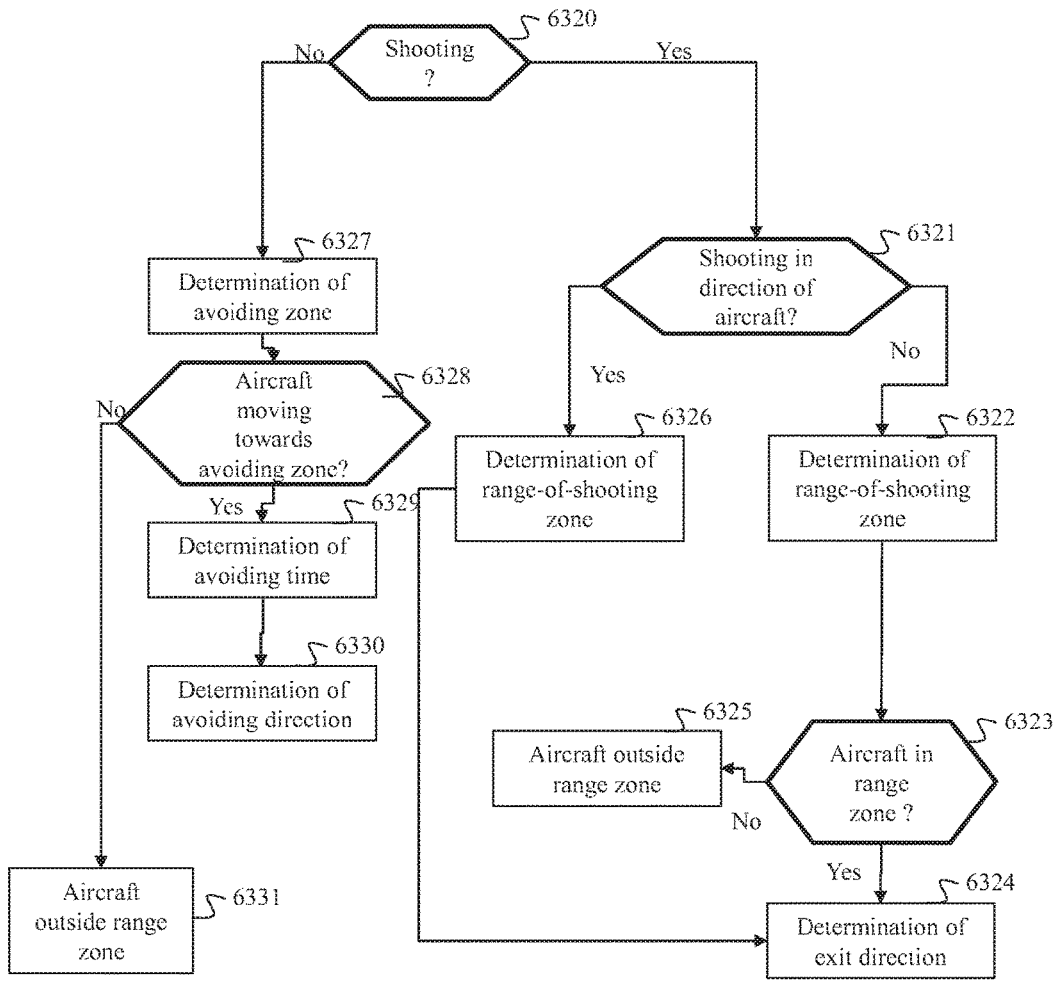
FIG. 6C illustrates schematically an example of a method for obtaining piloting information according to a type and geographical location of an origin of a detected event.

FIG. 6C illustrates schematically an example of a method for obtaining second items of piloting information according to the type and geographical origin of an event detected.

The method illustrated in relation to FIG. 6C uses information obtained by the processing module 113 when the method of FIG. 6B is implemented and which the processing module 113 stored in memory. This information gives indications on the event detected: visible shooting not directed towards the aircraft 10, visible shooting directed towards the aircraft 10, position light, non-visible shooting in the direction of the aircraft 10, aircraft 10 within range of shooting, etc.

In a step 6320, the processing module checks whether the event detected is a shooting. If the event is a shooting, the processing module 113 checks, during a step 6321, whether the shooting is directed towards the aircraft 10.

We have seen in relation to steps 6307 and 6313 that the processing module 113 determines that a shooting is directed towards the aircraft 10 when a shock wave, correlated with a first singularity detected in the LWIR/MWIR signal, is detected in the acoustic signal. The detection of this correlated shock wave also indicates that the aircraft 10 is within shooting range. It is important in this case to determine a range zone of the shooting in order to leave it as quickly as possible.

If the shooting is directed towards the aircraft 10 (and the aircraft 10 is within shooting range), the processing module 113 determines, during a step 6326, a range zone of the shooting. The range zone of a shooting is a sphere with its centre at the geographical origin of the shooting and with the range of a weapon that carried out the shooting as its radius. In one embodiment, the range used by the processing module 113 is a constant range corresponding to a maximum range measured during tests on a set of conventional weapons. Second items of piloting information comprising the geographical position of the origin of the shooting and the radius of the range zone are stored in a memory of the processing module 113.

Following step 6326, during a step 6324, the processing module 113 determines an exit direction from the range zone allowing to leave the range zone as quickly as possible. To do this, the processing module, using the information representing obstacles supplied by the piloting aid procedure 62, determines a direction for exiting the range zone such that a distance between the position of the aircraft and a boundary of the range zone is minimum, taking into account any obstacles. The second items of piloting information are enhanced by the exit direction determined.

If, during step 6321, the shooting is not directed towards the aircraft 10, the processing module 113 determines a range zone of the shooting by implementing a step 6322 identical to step 6326. However, the absence of detection of a shock wave does not allow to deduce as quickly whether the aircraft 10 is in the range zone of the shooting or outside the range zone of the shooting. Knowing the distance separating the geographical location of the origin of the shooting and the aircraft 10, the processing module 113, in a step 6323, determines whether the aircraft is situated in the range zone of the shooting or outside the range zone of the shooting.

If the aircraft 10 is outside the range zone, the second items of piloting information are enhanced, in a step 6325, by information indicating that the aircraft is outside the range zone of the shooting.

If the aircraft 10 is in the range zone, the processing module 113 implements step 6324 already explained.

If, during step 6320, the processing module verifies that the event detected is not a shooting, it deduces from this that the event detected is a detection of a signal light.

In a step 6327, the processing module 113 determines an avoidance zone around the geographical location of the signal light. In one embodiment, the processing module 113 determines the avoidance zone using a predefined distance representing the minimum distance that has to be maintained between the geographical location of the signal light and the aircraft 10. The avoidance zone is then a sphere with the geographical location of the signal light at its centre. Second items of piloting information comprising the geographical position of the signal light and the radius of the avoidance zone are stored in a memory of the processing module 113.

In a step 6328, the processing module 113 determines whether the aircraft is moving towards the avoidance zone.

To do this, the processing module uses information on orientation of the aircraft 10 supplied for example by the positioning device 114.

If the aircraft 10 is moving towards the avoidance zone, the processing module 113 determines an avoidance time, in a step 6329, from speed information supplied for example by the positioning device 114. The avoidance time is an estimation of a time that the aircraft 10 would need to reach the avoidance zone if it continues to move at the speed and orientation supplied by the position device 114. The second items of piloting information are enhanced by adding thereto the avoidance time determined.

In a step 6330, the processing module 113 determines at least one avoidance direction. To do this, the processing module, using the information representing obstacles supplied by the piloting aid procedure 62, determines at least one direction allowing to avoid the avoidance zone, while avoiding any obstacles. The second items of piloting information are enhanced by adding thereto each avoidance direction determined.

If the aircraft is not moving towards the avoidance zone, in a step 6331 the second items of piloting information are enhanced by adding thereto information indicating that the aircraft is not moving towards the avoidance zone.

The piloting aid information stored in memory is next used during step 64 in order to determine the piloting aid information.

Figure 7:
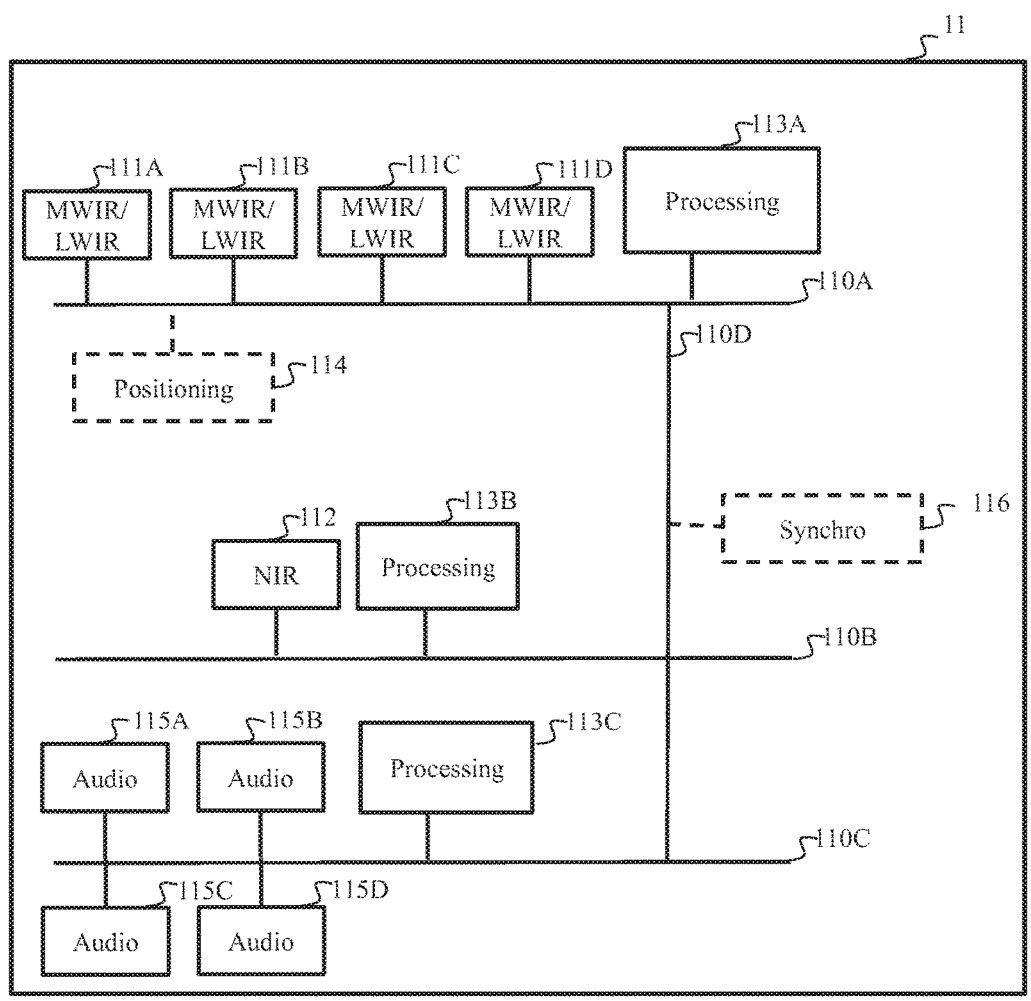
FIG. 7 illustrates schematically a second example of airborne shootings detection and piloting aid equipment according to the invention.

FIG. 7 illustrates schematically a second example of airborne shootings-detection and piloting-aid equipment 11. The airborne equipment described in relation to FIG. 7 is able to implement the method described in relation to FIG. 6A.

The airborne equipment 11 described in relation to FIG. 2 comprises a LWIR/MWIR device. Constraints in the technical implementation of LWIR/MWIR devices, such as bolometric sensors, mean that in general these sensors have low resolution, lower than a resolution of NIR devices. A LWIR/MWIR acquisition device of the bolometric sensor type can achieve a resolution of 1024 pixels in width and 768 pixels in height whereas a NIR sensor can achieve for example a resolution of 2560 pixels in width and 2160 pixels in height.

Muzzle flashes caused by shootings are in general of small size, all the more so since they are seen by the aircraft 10 from a position that may be relatively distant from the origin of the shooting. So that a muzzle flash can be detected in the form of a light flash in the LWIR/MWIR image, it is preferable for the LWIR/MWIR acquisition device to have sufficient resolution. A resolution of 1024 by 768 is generally judged to be too low.

The airborne equipment 11 described in relation to FIG. 7 comprises a multisensor system comprising four LWIR/MWIR systems 111A, 111B, 111C and 111D, an NIR system 112 and four acoustic devices 115A, 115B, 115C and 115D.

Each LWIR/MWIR system 111A, 111B, 111C and 111D comprises an LWIR/MWIR acquisition device identical to the acquisition device 1111. The LWIR/MWIR optical device of each LWIR/MWIR system 111A, 111B, 111C and 111D covers an optical field corresponding to a quarter of the optical field covered by the LWIR/MWIR optical device 1110. The LWIR/MWIR systems 111A, 111B, 111C and 111D are arranged in the airborne equipment so that, by combining the optical fields covered by the LWIR/MWIR optical devices of the LWIR/MWIR systems 111A, 111B, 111C and 111D, a combined optical field is obtained, identical to the optical field covered by the NIR optical device 1120. Moreover, by combining the LWIR/MWIR images supplied by the four LWIR/MWIR systems 111A, 111B, 111C and 111D, LWIR/MWIR images having a resolution of 2048 pixels in width and 1536 pixels in height are obtained. Consequently, by combining the information supplied by the four LWIR/MWIR systems 111A, 111B, 111C and 111D, a system is obtained equivalent to a LWIR/MWIR system covering an optical field identical to the optical field covered by the NIR system 1120 and supplying images having a resolution of 2048 pixels in width and 1536 pixels in height.

The four acoustic systems 115A, 115B, 115C and 1115D are identical to the acoustic system 115. Using a plurality of acoustic sensors allows to improve reception of sounds surrounding the aircraft 10. The acoustic sensors may in fact be distributed over the airborne equipment 11 so as to receive sounds coming from multiple directions.

The airborne equipment 11 described in relation to FIG. 7 comprises three communication buses 110A, 110B and 110C connected by a communication bus 110D.

The communication bus 111A connects the LWIR/MWIR devices 111A, 111B, 111C and 111D to a processing module 113A similar to the processing module 113 described in relation to FIG. 5.

The communication bus 111B connects the NIR device 112 to a processing device 113B similar to the processing module 113 described in relation to FIG. 5.

The communication bus 111C connects the four acoustic devices 115A, 115B, 115C and 115D to a processing module 113C similar to the processing module 113.

When the airborne equipment 11 comprises a positioning device 114 and a synchronisation device 116, the positioning device 114 is connected to the bus 110A whereas the synchronisation device 116 is connected to the communication bus 110D.

In one embodiment, a processing module different from the processing modules 113A, 113B and 113C, referred to as the master processing module, centralises the implementation of the method in FIG. 6A. The master processing module is then connected to the communication bus 110D. The master processing module activates and deactivates the processing modules 113A, 113B and 113C so that they trigger the acquisition of the LWIR/MWIR, NIR and acoustic signals so that they implement step 630 described in relation to FIG. 6A and detailed in relation to FIG. 6B.

Step 6300, allowing to seek a first singularity in the LWIR/MWIR signal, is implemented by the processing module 113A.

Following the implementation of step 6300, the processing module 113A transmits a message to the master processing module indicating whether a first singularity has been detected in the LWIR/MWIR signal. The master processing module retransmits this message to the processing module 113B. According to a result of the search for a first singularity, the processing module 113B implements step 6301 or step 6308.

According to a result of the search for a singularity in the NIR signal in step 6301, the processing module 113B implements step 6302 or steps 6303 and 6304.

Following the implementation of step 6304, the processing module 113B transmits a message to the master processing module containing information representing the geographical location of the origin of the shooting. The master processing module retransmits this message to the processing module 113C. The processing module 113C then implements steps 6305, 6306 and 6307.

According to a result of the search for a singularity in the NIR signal in step 6308, the processing module 113B implements step 6309 and 6310 or transmits a message to the master processing module indicating that no singularity has been found in the LWIR/MWIR and NIR signals. The master processing module retransmits this message to the processing module 113C.

Following reception of this message, the processing module 113C implements steps 6311, 6312, 6313 and 6314.

In one embodiment, the method described in relation to FIG. 6A is implemented by the processing modules 113A, 113B and 113C without intervention from a fourth processing module. One of the processing modules 113A, 113B and 113C is then designated the master processing module. The master processing module thus designated implements steps 62, 64 and 632 and controls the implementation of step 61 and 630 by the processing modules 113A, 113B and 113C.

In one embodiment, the master processing module implements the method in FIG. 6A. In this embodiment, the processing modules 113A, 113B and 113C provide only the management of the acquisition and shaping of the signals issuing from the LWIR/MWIR, NIR and acoustic devices with a view to use thereof by the master processing module.

Figure 8:
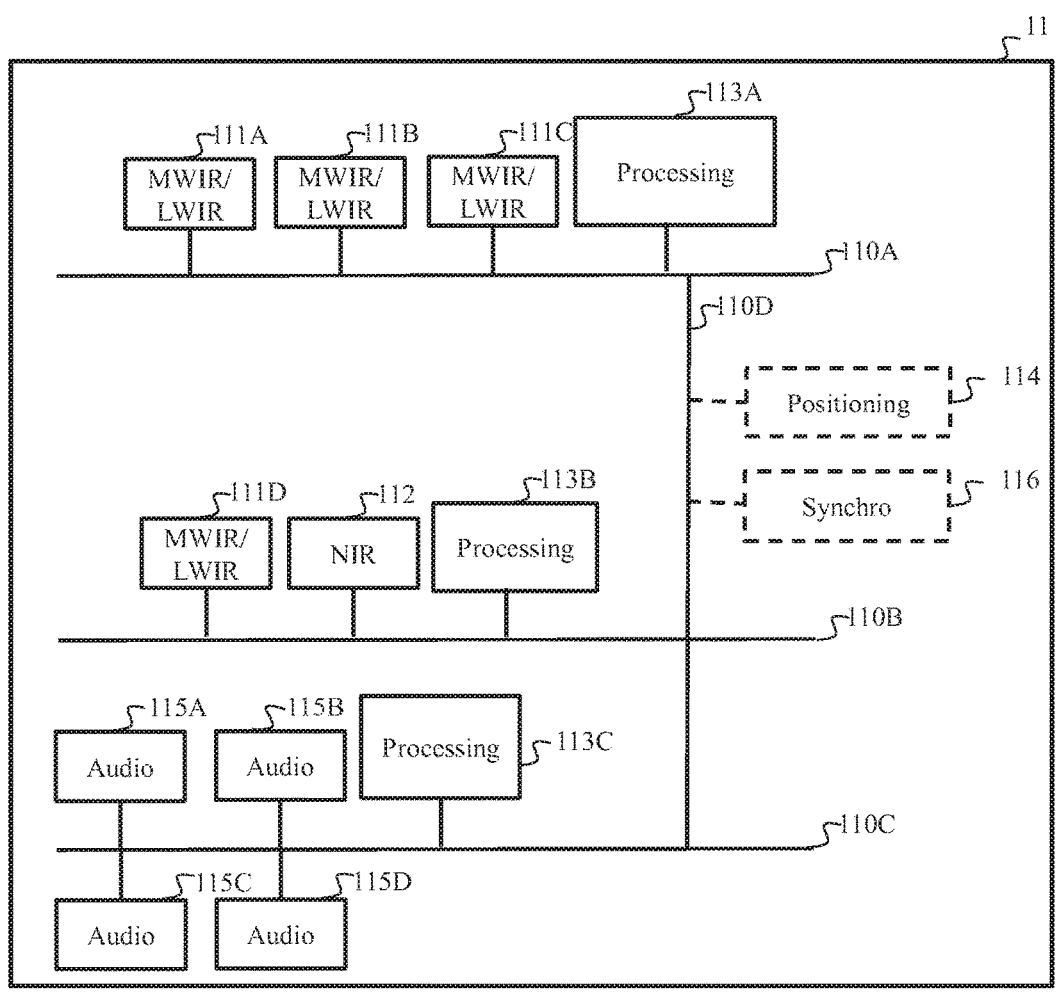
FIG. 8 illustrates schematically a third example of airborne shootings detection and piloting aid equipment according to the invention.

FIG. 8 illustrates schematically a third example of airborne shootings detection and piloting aid equipment 11. The airborne equipment 11 described in relation to FIG. 8 is able to implement the method described in relation to FIG. 6A.

The airborne equipment 11 described in relation to FIG. 8 has a configuration suited to a use of hardware processing modules having limited processing capacities. Some hardware processing modules have limited processing capacities. These hardware processing modules can simultaneously process only a limited number of image flows. Although hardware processing modules having greater processing capacities exist, the hardware processing modules with limited capacities are still used since these modules have tried and tested robustness and/or because they are inexpensive.

The example of airborne equipment 11 described in relation to FIG. 8 uses processing modules 113A and 113B capable of simultaneously processing three image flows. However, the airborne equipment 11 described in relation to FIG. 8 comprises a multisensor system identical to the multisensor system of the airborne equipment described in relation to FIG. 7.

So that the airborne equipment 11 can process the LWIR/MWIR and NIR signals simultaneously, the airborne equipment 11 uses a suitable configuration. In this configuration, three communication buses 110A, 110B and 110C are connected by a communication bus 110D.

The communication bus 111A connects the LWIR/MWIR systems 111A, 111B and 111C to a processing module 113A similar to the processing module 113 described in relation to FIG. 5.

The communication bus 111B connects the LWIR/MWIR system 111D and the NIR system 112 to a processing module 113B similar to the processing module 113 described in relation to FIG. 5.

The communication bus 111C connects the four acoustic devices 115A, 115B, 115C and 115D to a processing module 113C similar to the processing module 113 described in relation to FIG. 5. When the airborne equipment 11 comprises a positioning device 114 and a synchronisation device 116, the positioning device 114 and the synchronisation device 116 are connected to the communication bus 110D.

By distributing the LWIR/MWIR systems 111A, 111B, 111C and 111D and the NIR system 112 as described in relation to FIG. 6, each processing module 113A and 113B receives at a maximum three image streams.

Figure 9:
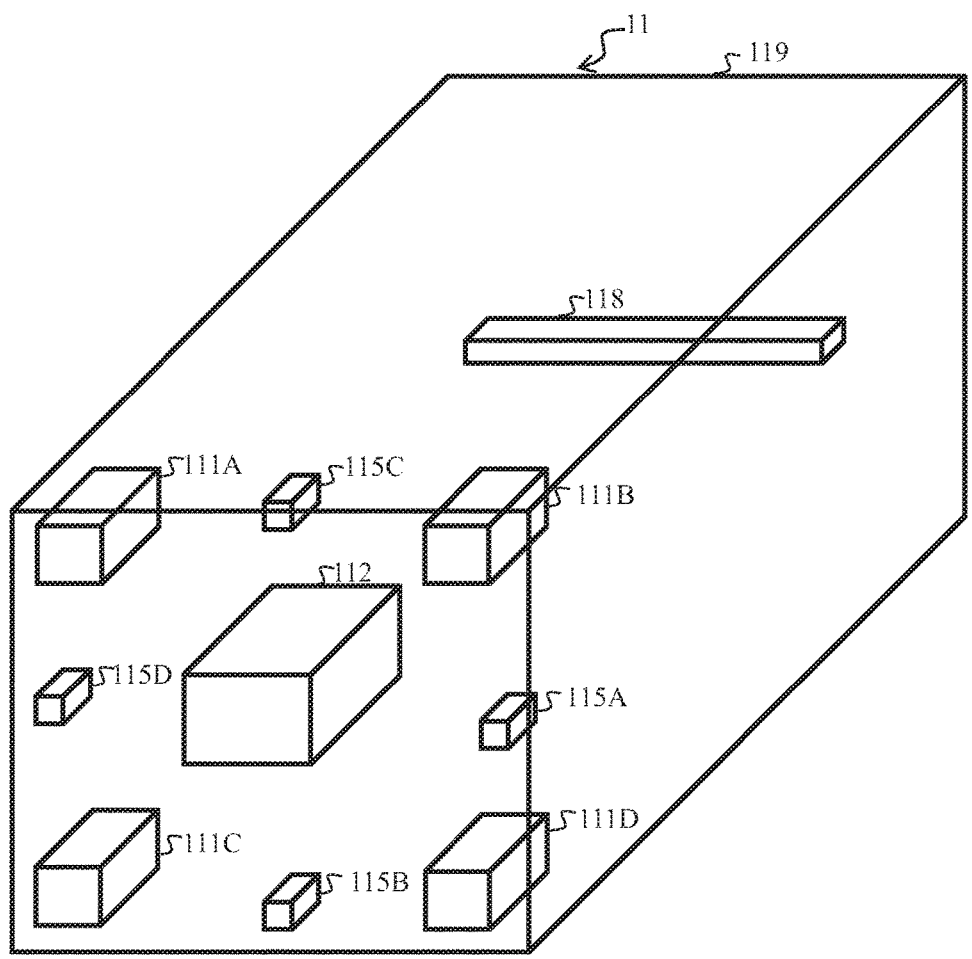
FIG. 9 illustrates schematically an example of mechanical installation of airborne shootings detection and piloting aid equipment according to the invention.

FIG. 9 illustrates schematically an example of mechanical installation of airborne shootings detection and piloting aid equipment 11. The airborne equipment 11 is for example one of the items of airborne equipment 11A and 11B. This example of mechanical installation corresponds to examples of airborne equipment 11 described in relation to FIGS. 7 and 8. In the example in FIG. 9, the airborne equipment 11 comprises a housing 119 integrating each element constituting the airborne equipment 11. In the example described in relation to FIG. 9, the housing 119 has a cubic shape. It could however have a more aerodynamic shape. On one of the square faces of the airborne equipment, referred to as the observation face, directed towards the zone to be observed, the multisensor system is positioned.

The multisensor system comprises the four LWIR/MWIR systems 111A, 111B, 111C and 111D. Each LWIR/MWIR system 111A, 111B, 111C and 111D is situated in a different corner of the square face representing the observation face.

Each LWIR/MWIR optical device 1110 allows to cover an optical field of 60° horizontally and 45° vertically. Each LWIR/MWIR optical device 1110 and each LWIR/MWIR sensor 1111 is orientated towards the zone to be observed. The distribution of the LWIR/MWIR systems 111A, 111B, 111C and 111D at the four corners of the observation phase enables the airborne equipment 11 to supply LWIR/MWIR images representing an optical field of 120° horizontally and 90° vertically with a resolution of 2048 pixels in width and 1536 pixels in height.

The multisensor system also comprises an NIR system situated at the centre of the square face representing the observation face of the airborne equipment 11. The NIR acquisition device 1121 has for example a resolution of 2560 pixels in width and 1920 to 2160 pixels in height. Moreover, the NIR optical device 1120 allows to cover an optical field of 120° horizontally and 90° vertically identical to the optical field covered by the LWIR/MWIR systems 111A, 111B, 111C and 111D.

Moreover, the airborne equipment 11 comprises four acoustic systems (115A, 115B, 115C, 115D) distributed over the housing 119 so as to capture sounds emanating from a plurality of different directions.

The airborne equipment 11 also comprises a processing apparatus 118. The processing apparatus 118 integrates the processing modules 113A, 113B and 113C as well as the master processing module if present. The LWIR/MWIR 111A, 111B, 111C, 111D, NIR 112 and acoustic 115A, 115B, 115C, 115D systems, and the positioning 114 and synchronisation devices 116 when present, are connected to the processing apparatus 118 by the communication buses 110A, 110B, 110C and 110D.

In one embodiment, the aircraft 10 comprises a plurality of items of airborne equipment 11, as described in relation to FIGS. 2, 7 and 8. The items of airborne equipment installed on the aircraft 10 are sufficient in number and have a suitable positioning on the aircraft 10 making it possible, by combining the LWIR/MWIR images, to obtain an image representing a cylindrical panorama, referred to as an LWIR/MWIR cylindrical panorama, around the aircraft 10 and making it possible, by combining the NIR images, to obtain an image representing a cylindrical panorama, referred to as an NIR panorama, around the aircraft 10. For example, in the case of an aircraft comprising airborne equipment as described in relation to FIG. 7 or 8, the optical field covered by the LWIR/MWIR device being 120° horizontally and the optical field covered by the NIR device being 120° horizontally, it is necessary to distribute at least three items of airborne equipment 11 on the aircraft 10 in order to ensure that the total optical field is 360° around the aircraft 10.

In one embodiment, the aircraft 10 comprises at least four items of airborne equipment 11 as described in relation to FIGS. 7 and 8. The items of airborne equipment 11 are positioned so as to cover a total optical field of 360° around the aircraft 10. Moreover, the aircraft 10 has a number of items of airborne equipment 11 allowing overlaps of optical fields on some sub-parts of the total optical field. The overlaps of an optical field allow to obtain a stereoscopic vision in said sub-parts of the total optical field.

Stereoscopic vision can be used when using 3D reconstruction techniques using epipolar geometry, since it allows to supply images of the same scene from different viewpoints.

Stereoscopic vision can also, by known methods, be used to determine a distance between an obstacle and the aircraft 10. For this purpose it suffices to know an actual size of a reference object appearing in the LWIR/MWIR images used to obtain a 3D reconstruction of an object or of the ground surrounding the aircraft 10. By calculating a ratio between the apparent size of the reference object in the LWIR/MWIR images and the actual size of the reference object, it is possible to determine the distance between the reference object and the aircraft 10. From the distance between the reference object and the aircraft 10 and the 3D reconstruction of an obstacle or of the ground surrounding the aircraft 10, it is possible to get back to the distances separating the aircraft 10 from any other object contained in the 3D reconstruction. In addition, by measuring the variations in the apparent size of the object in the LWIR/MWIR images, it is possible to determine an orientation and a relative speed of the aircraft 10 with respect to the reference object.

In one embodiment, the airborne equipment does not comprise any positioning device 114. The position, orientation and speed of the aircraft 10 are determined by the processing module 113 or the master processing module using information supplied by the stereoscopic vision.

The invention claimed is:

1. An airborne equipment for an aircraft configured to jointly detect shootings and provide piloting aid, wherein the airborne equipment comprises:
    a multi-sensor system supplying signals representing an environment of the aircraft comprising: at least one system, referred to as a LWIR/MWIR system, supplying a signal, referred to as a LWIR/MWIR signal, representing infrared radiation lying in the far infrared or mid-infrared range; at least one system, referred to as a NIR system, supplying a signal, referred to as a NIR signal, representing infrared radiation lying in the near infrared range; and at least one acoustic system supplying an acoustic signal;
    at least one processing module adapted to implement:
        a piloting aid procedure for obtaining first piloting information comprising information representing obstacles present in the environment of the aircraft; and
        a shootings detection procedure for obtaining second piloting information comprising information representing shootings in the vicinity of the aircraft, the piloting aid procedure and the shootings detection procedure using signals representing an environment of the aircraft comprising at least the LWIR/MWIR signal;
    wherein piloting aid parameters are obtained from said first and second piloting information; and
    wherein the shootings detection procedure is adapted for:
        seeking singularities in signals representing an environment of the aircraft, comprising seeking a first singularity in a first signal included in the signals representing an environment of the aircraft and seeking a second singularity in at least a second signal included in the signals representing an environment of the aircraft;
        determining, using a result of the seeking of singularities, whether an event corresponding to an event type sought has been detected;
        determining a geographical location of an origin of a detected event using information representing obstacles present in the environment of the aircraft supplied by the piloting aid procedure; and,
        obtaining the second piloting information according to a type of event detected and a geographical location of an origin of said event.

2. The airborne equipment according to claim 1, wherein each LWIR/MWIR system comprises an optical device, referred to as a LWIR/MWIR optical device, and an acquisition device, referred to as a LWIR/MWIR acquisition device, supplying a LWIR/MWIR signal in the form of images, referred to as LWIR/MWIR images, and each NIR system comprises an optical device, referred to as a NIR optical device and an acquisition device, referred to as a NIR acquisition device, supplying a NIR signal in the form of images, referred to as NIR images, the multi-sensor system comprising a number of LWIR/MWIR systems and NIR systems dependent on a respective resolution of the LWIR/MWIR and NIR images.

3. The airborne equipment according to claim 2, wherein said LWIR/MWIR acquisition device comprises a bolometric sensor able to capture the LWIR/MWIR signal.

4. An aircraft comprising a plurality of airborne equipment according to claim 2, allowing, by combining the LWIR/MWIR images, to obtain an image representing a 360° panorama, referred to as a LWIR/MWIR panorama, around the aircraft and allowing, by combining the NIR images, to obtain an image representing a 360° panorama, referred to as a NIR panorama, around the aircraft.

5. The airborne equipment according to claim 1, wherein information representing obstacles present in the environment of the aircraft is a three dimensional reconstruction of a terrain above which the aircraft is moving.

6. A combined piloting aid and shootings detection method, implemented by airborne equipment integrated in an aircraft, wherein the method comprises:
    acquiring signals representing an environment of the aircraft comprising: a signal, referred to as a LWIR/MWIR signal, representing infrared radiation lying in the far infrared or mid-infrared range, supplied by a system, referred to as a LWIR/MWIR system; a signal, referred to as a NIR signal, representing infrared radiation lying in the near infrared range, supplied by a system, referred to as a NIR system; and an acoustic signal supplied by an acoustic system,
    implementing a piloting aid procedure and a shootings detection procedure, the piloting aid procedure allowing to obtain first piloting information comprising information representing obstacles present in the environment of the aircraft and the shootings detection procedure allowing to obtain second piloting information comprising information representing shootings in a vicinity of the aircraft, the piloting aid procedure and the shootings detection procedure using signals representing the environment of the aircraft comprising at least the LWIR/MWIR signal;

obtaining piloting aid parameters from the first and second piloting information; the shootings detection procedure comprising:

seeking singularities in the signals representing the environment of the aircraft, the seeking of singularities comprising a search for a first singularity in a first signal included in the signals representing the environment of the aircraft and a search for a second singularity in at least a second signal included in the signals representing an environment of the aircraft;

when a result of the search for the singularities shows that an event corresponding to an event type sought has occurred, determining a geographical location of an origin of said event using information representing obstacles present in the environment of the aircraft obtained during the implementation of the piloting aid procedure; and obtaining the second piloting information according to said type and the geographical location of the origin of said event.

7. The method according to claim 6, wherein the NIR system supplies the NIR signal in the form of images, referred to as NIR images, and the LWIR/MWIR system supplies the LWIR/MWIR signal in the form of images, referred to as LWIR/MWIR images, and in that a singularity is present in the NIR signal when a flash of light is detected in at least one NIR image, a singularity is present in the LWIR/MWIR signal when a flash of light is detected in at least one LWIR/MWIR image, and a singularity is present in the acoustic signal when a shock wave is detected in the acoustic signal.

8. The method according to claim 7, wherein, when the search for at least one singularity in the signals representing an environment of the aircraft allows to detect a first flash of light in at least one LWIR/MWIR image and a second flash of light, correlated spatially and temporally with the first flash of light, in at least one NIR image, the event is identified as a solar reflection and does not correspond to an event sought.

9. The method according to claim 7, wherein, when the search for at least one singularity in the signals representing an environment of the aircraft allows to detect a first flash of light in the LWIR/MWIR signal, no second flash of light correlated with the first flash of light having been detected in the NIR signal, the event is identified as a shooting and corresponds to an event sought.

10. The method according to claim 9, wherein, when, following the identification of an event corresponding to a shooting and to the determination of the geographical location of the origin of said event, a shock wave having a temporal correlation with the first flash of light is detected in the acoustic signal, the event is identified as a shooting in the direction of the aircraft, the geographical location of the origin of said event being used to determine a level of temporal correlation between the first flash of light and the shock wave.

11. The method according to claim 7, wherein, when the search for at least one singularity in the signals representing an environment of the aircraft allows to detect a second flash of light in the NIR signal, no first flash of light correlated with the second flash of light having been detected in the LWIR/MWIR signal, the event is identified as a detection of a signal light and corresponds to an event sought.

12. The method according to claim 7, wherein information on the duration of a flash of light is associated with each flash of light, the duration of the flash of light being used to refine the identification of the type of event.

13. The method according to claim 7, wherein information on the frequency of repetition of a flash of light is associated with each detection of a flash of light, the frequency of repetition being used to refine the identification of the type of event.

14. The method according to claim 6, wherein, when the event identified corresponds to a shooting, the piloting aid parameters obtained comprise information representing a range-of-shooting zone and/or a direction of exit from a range-of-shooting zone.

15. The method according to claim 6, wherein, when the event identified corresponds to a detection of a signal light, the piloting aid parameters obtained comprise information representing a zone for avoiding the signal light and/or information representing an avoiding time corresponding to an estimation of a time that would be necessary for the aircraft to reach a zone for avoiding the signal light and/or a direction of avoiding a zone for avoiding the signal light.

16. The method according to claim 6, wherein the method is implemented by an airborne equipment for an aircraft configured to jointly detect shootings and provide piloting aid, comprising:

a multi-sensor system comprising: at least one system, referred to as a LWIR/MWIR system, supplying said LWIR/MWIR signal; at least one system, referred to as a NIR system, supplying said NIR signal; and at least one acoustic system supplying said acoustic signal;

at least one processing module adapted to implement said piloting aid procedure; and said shootings detection procedure; and, the airborne equipment being adapted to obtain said piloting aid parameters from said first and second piloting information.

17. A computer program embodied in a non-transitory computer readable medium causing a computer to execute the method according to claim 6.

18. A non-transitory storage device storing a computer program causing a computer to execute the method according to claim 6.

19. The method according to claim 6, wherein information representing obstacles present in the environment of the aircraft is a three dimensional reconstruction of a terrain above which the aircraft is moving.

* * * * *